No. 888,323. PATENTED MAY 19, 1908.
J. P. FOX.
ROTARY ENGINE.
APPLICATION FILED SEPT. 19, 1906.

2 SHEETS—SHEET 1.

WITNESSES
E. S. Horton
John M. Redmond.

INVENTOR
John Pierce Fox
BY Paul A Fuller
His ATTORNEY

No. 888,323.

PATENTED MAY 19, 1908.

J. P. FOX.
ROTARY ENGINE.
APPLICATION FILED SEPT. 19, 1906.

2 SHEETS—SHEET 2.

WITNESSES
E. S. Horton
John M. Redmond

INVENTOR
John Pierce Fox
BY Paul A. Talbot.
His ATTORNEY

UNITED STATES PATENT OFFICE.

JOHN PIERCE FOX, OF EVERETT, WASHINGTON.

ROTARY ENGINE.

No. 888,323.  Specification of Letters Patent.  Patented May 19, 1908.

Application filed September 19, 1906. Serial No. 335,316.

*To all whom it may concern:*

Be it known that I, JOHN PIERCE FOX, a citizen of the United States, and a resident of Everett, in the county of Snohomish, State of Washington, have invented new and useful Improvements in Rotary Engines, of which the following is a specification.

My invention, relates to improvements in rotary engines in which a centrally disposed rotary head provided with teeth similar in shape to the teeth of a spur gear wheel, are used to form the pistons. The addendum of the teeth being adapted to fit a cylinder, and the root of the said teeth adapted to roll upon abutments, thus forming an impelling chamber between a tooth, a portion of the cylinder, a portion of the said rotary head and a portion of the said abutment's cylindrical surface. The said abutments being driven by the said rotary head and spur wheels secured to the several shafts and adapted to cause the said teeth to intermesh with a notched or recessed surface of the said abutment's cylindrical surface; in combination with steam admission ports provided on a flanged end-piece, which in a reversible engine is adapted to be oscillated relative to the said rotary head to cause the said steam admission ports contained therein to travel from one side of the several teeth to the other, relative to the direction in which it may be desired to run the engine.

The object of my invention is to construct a rotary engine in which the steam is cut off economically, and by the use of the reverse mechanism herein set forth, the direction of travel of my device may be positively reversed.

Another object is to eliminate the reciprocating parts which does away with the wear on all running parts connected thereto, as well as other working parts of the engine.

Figure 1:
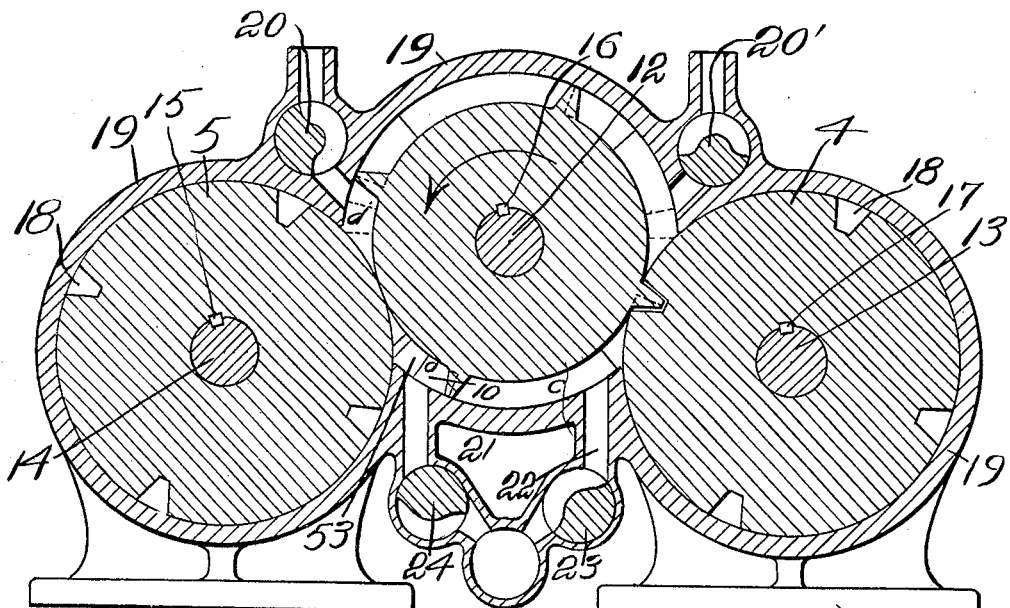
Figure 2:
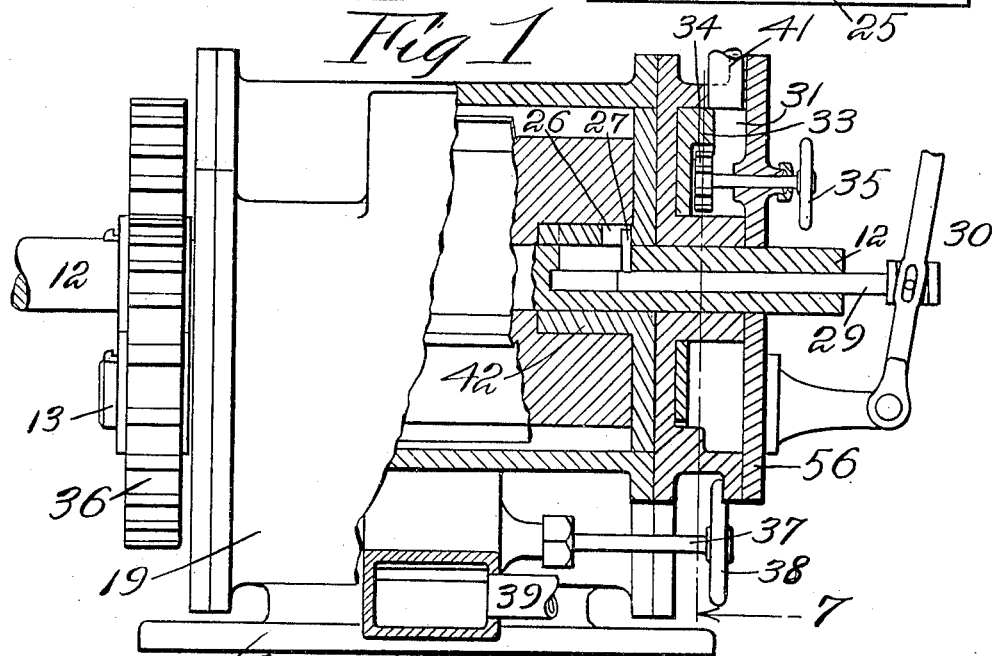
Figure 3:
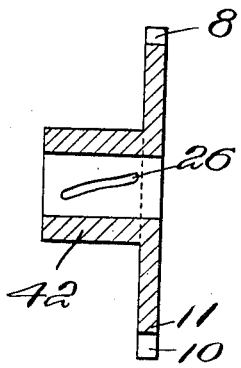
Figure 4:
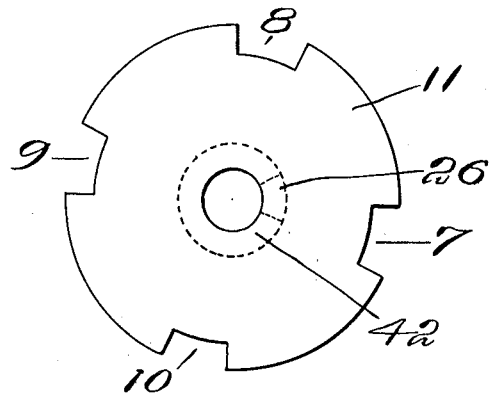
Figure 5:
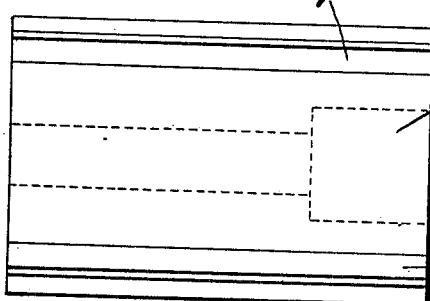
Figure 6:
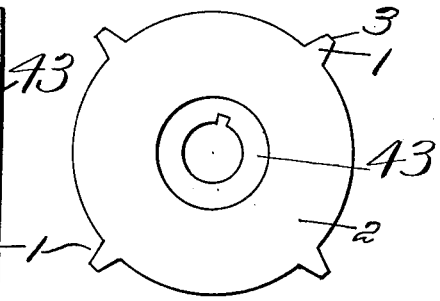
Figure 7:
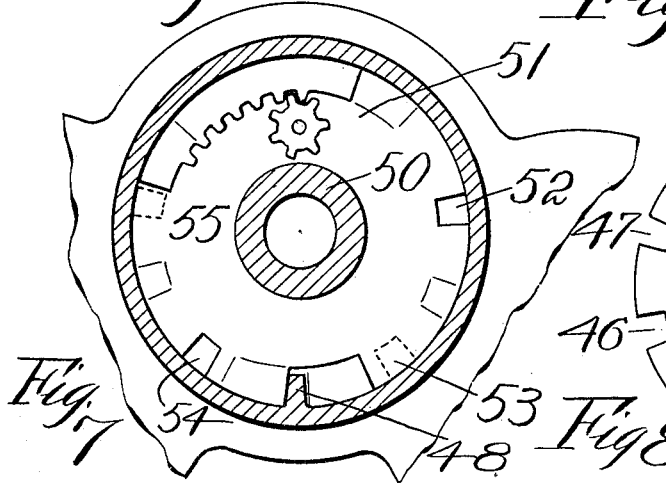
Figure 8:
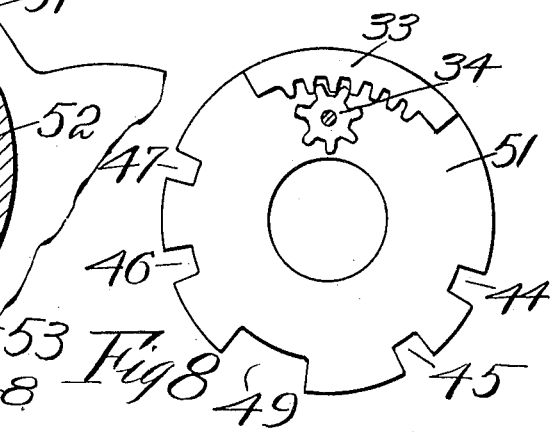

I accomplish these objects by the construction illustrated in the accompanying drawings in which Figure 1 is a transverse section through the center of my device showing the abutments and rotary head as well as the disposition of the exhaust valves. Fig. 2 is a side elevation and fragmentary section through the center, parallel with the axis of the shaft, showing the manner in which the reverse gear is operated. Fig. 3 is a section through the center of the flanged end piece and sleeve. Fig. 4 is an end elevation of Fig. 3. Fig. 5 is a side elevation of the rotary head. Fig. 6 is an end elevation of Fig. 5. Fig. 7 is a section at 7 Fig. 2, showing the disposition of the ports in the steam chest. Fig. 8 is a side elevation of the steam port reverse disk.

Similar reference numerals refer to similar parts throughout the several views in the accompanying drawings.

The rotary head 2 is provided with teeth as 1, which are adapted to form a steam impelling chamber between the said teeth, the said rotary head and a cylinder or casing 19, and the abutments 4 and 5, which are keyed to shafts 13 and 14 by means of the keys 15 and 17. The said shafts 13 and 14 are connected to spur wheels 36 which are driven by the shaft 12 which is keyed to the aforesaid rotary head 2 by the key 16. The said rotary head is provided with a counterbore 43 adapted to receive a sleeve 42 which is connected to a flanged end piece 11 having steam admission ports 7, 8, 9 and 10 which are thrown to follow the tooth which forms said steam impelling chamber and which is fed by the said steam admission ports. The said steam admission ports being adapted to work in conjunction with reverse ports 44, 45, 46 and 47 to cut the steam off at the desired proportion of the travel of the teeth 1 between the points at which the steam is admitted and exhausted. It is obvious that to reverse my device it is first necessary to advance the steam admission ports that they may lead the teeth 1 instead of following said teeth 1, which will cause the steam to be admitted into the space between the several teeth 1 and the abutment which is in advance relative to the present direction of travel of the rotary head which will cause a back pressure upon the said several teeth 1, thus stopping the engine's progress in that direction. It has been proven not necessary to maintain a steam tight joint while the teeth 1 are traveling in the notches 18 as upon further advancing to a point where the addendum 3 of the several teeth 1 comes in contact with the cylinder or casing 19, and the abutments 4 and 5 come in contact with rotary head 2, the said teeth 1 and a portion of the cylindrical surface of the said abutments 4 and 5 will form a steam tight impelling chamber and thus the steam is not admitted until the teeth 1 have advanced to the point above stated, to reverse the engine it is obvious that these ports contained in the casing will have to be changed to the same point in a reversed position bearing relation to the said abutments 4 and 5 which is accomplished by a steam port reverse disk 51, shown in Fig. 8, open and close ports as 52, 53, 54, and 55 shown in Fig. 7, which is done by means of a segmental rack 33 and a pinion 34 which is connected to a wheel 35 on the exterior of a steam chest cover 56. The steam is exhausted when the teeth 1 pass exhaust ports 20 and 20′, 21 and 22. The exhaust ports 21 and 22 and 20 and 20′ are alternately opened and closed when the engine is reversed. It will be seen that when the engine is running in the direction of the arrow Fig. 1 that the steam is being admitted through ports 53 and the steam admission ports 10 into the impelling chamber (a) and is working expansively in the impelling chamber (b) formed as heretofore set forth, and is exhausting in the impelling chambers (c) and (d) through the exhaust ports 20 and 22, the exhaust valves 20″ and 24 being closed and exhaust valves 19′ and 23 being open.

To reverse the direction of travel above mentioned the lever 30 is connected to a reverse shaft 29 which is provided with a reverse pin 27 adapted to travel in a slot 28 in the shaft 12 and a spirally disposed slot 26 provided in a sleeve 42 which is rigidly secured to or cast integral with the flanged end piece 11, which is provided with the steam admission ports 7, 8, 9 and 10 adapted to admit the steam as heretofore described and the said reverse pin is thrust to the other end of the aforesaid slots 28 and 26, the exhaust valves 19′ and 20″, 23 and 24 as well as the steam part reverse disk 51 which is mounted on the hub 50 and operated by said rack 33 and pinion 34 are then reversed. Viz. the exhaust valve 24 opened and the exhaust valve 23 closed; the steam ports 52 and 54 closed and the steam ports 53 and 55 opened by means of a suitable reversed gear which is accessible from the exterior of my device and adapted to oscillate the steam port reverse disk 51 as above set forth until stopped by the detent 48 striking the opposite end of the notch 49. I do not wish to be limited to exact construction illustrated in the accompanying drawings and set forth in this specification, as I wish the privilege of making such constructive detailed changes as are within the scope of my patent.

Having thus described my invention, what I claim as new and desire to secure by Letters Patent in the United States, is;

1. In a rotary engine of the nature indicated, the combination of a rotary head having teeth adapted to intermesh in notches disposed on the cylindrical surface of abutments to form an impelling chamber as set forth, a reverse disk and a flanged end piece adapted to co-act therewith and oscillated by means of a spirally disposed slot, a reverse pin adapted to travel in said slot and in the slot provided in the shaft on which the aforesaid rotary head is mounted, the said reverse pin being rigidly secured to a reverse shaft adapted to be thrust longitudinally the axis of the said shaft by the means of a lever secured to the exterior of my device substantially as and for the purpose set forth.

2. In a rotary engine of the nature indicated a rotary head being provided with teeth and adapted to form a steam impelling cylinder in combination with abutments substantially as set forth, a flanged end piece provided with steam admission ports the said flanged end piece in combination with exhaust valves and a steam port reverse disk being adapted to reverse the direction of travel of the said rotary head, means for reversing the said flanged end piece, exhaust valves, steam port reverse disk, all substantially as and for the purpose set forth.

3. In a rotary engine of the nature indicated a rotary head being provided with teeth and adapted to form steam impelling cylinder in combination with abutments substantially as set forth, a flanged end piece provided with steam admission ports the said flanged end piece in combination with exhaust valves and steam port reverse disk being adapted to reverse the direction of travel of the said rotary head, means for reversing the said flanged end piece, exhaust valves, steam port reverse disk, a suitable frame work or casing adapted to journal the said rotary head and abutments and adapted to support the exhaust valves and reverse mechanism as well as to form a portion of the said steam impelling chambers all substantially as and for the purpose set forth.

4. In a rotary engine of the nature indicated a rotary head provided with teeth adapted to form steam impelling chambers in conjunction with a cylinder or casing and abutments in combination with a reverse mechanism embodying a flanged end piece provided with steam admission ports, the said flanged end piece adapted to be oscillated relative to the teeth and rotary head a steam port reverse disk adapted to open and close ports and reverse ports to act in conjunction with steam admission ports contained in the said flanged end piece to admit steam and cut the supply of steam off in impelling chambers at desired intervals and relative to the position of the teeth and exhaust ports.

5. In a rotary engine of the nature indicated a rotary head provided with teeth, the addendum of the said teeth adapted to fit the inner surface of the cylinder or casing the root of the said teeth adapted to form substantially a cylindrical surface of the said rotary head which is held in contact with the cylindrical surface of abutments to form a steam tight joint therebetween, the said rotary head being disposed substantially higher than the said abutments in elevation to form a steam impelling chamber (a) adapted to maintain the pressure on one of the said teeth or the steam impelling chamber (c) to cause pressure to be applied to the teeth and the said rotary head at all times when pressure is applied to the said engine a flanged end piece being provided with a spirally disposed slot adapted to cause the said flanged end piece to oscillate relative to the said rotary head and to admit steam to said impelling cylinder.

6. In a rotary engine of the nature indicated a rotary head provided with teeth, the addendum of the said teeth adapted to fit the inner surface of the cylinder or casing the root of the said teeth adapted to form substantially a cylindrical surface of the said rotary head which is held in contact with the cylindrical surface of abutments to form a steam tight joint therebetween, the said rotary head being disposed substantially higher than the said abutments in elevation to form a steam impelling chamber (a) adapted to maintain the pressure on one of the said teeth, or the steam impelling chamber (c) to cause pressure to be applied to the teeth and the said rotary head at all times when pressure is applied to the said engine a flanged end piece being provided with a spirally disposed slot adapted to cause the said flanged end piece to oscillate relative to the said rotary head a reverse port disk and to admit steam in said impelling chamber adapted to co-act with said flanged end piece to admit steam through steam admission ports at the desired point relative to the abutments to cause the steam thus admitted to act against the said rotary head and said teeth, only when the addendum of a tooth comes in contact with the cylinder or casing to form an impelling chamber substantially as set forth.

7. In a rotary engine of the nature indicated a steam port reverse disk adapted to act in conjunction with a flanged end piece having steam admission ports, means for oscillating the said steam port reverse disk and means for oscillating the said flanged end piece relative to the rotary head and teeth contained thereon all substantially as and for the purpose set forth.

8. In a rotary engine of the nature indicated a steam port reverse disk adapted to act in conjunction with a flanged end piece having steam admission ports, means for oscillating the said steam port reverse disk and means for oscillating the said flanged end piece relative to the rotary head and teeth contained thereon, the said steam port reverse disk being provided with reverse ports adapted to open and close ports to cause the steam to be admitted at the desired position at first one side of the said abutments and in reversing the engine to substantially the opposite side of the said abutments relative to the abutment's cylindrical surface which is in contact with the cylindrical surface or root of the teeth of the said rotary head.

9. In a rotary engine of the nature indicated a steam port reverse disk adapted to act in conjunction with a flanged end piece having steam admission ports means for oscillating the said steam port reverse disk and means for oscillating the said flanged end piece relative to the rotary head and teeth contained thereon, the said steam port reverse disk being provided with reverse ports adapted to open and close ports to cause the steam to be admitted at the desired position at first one side of the said abutments and in reversing the engine to substantially the opposite side of the said abutments relative to the abutment's cylindrical surface which is in contact with the cylindrical surface or root of the teeth of the said rotary head, a steam chest adapted to supply steam to the said reverse ports and admission ports, the said steam chest also being provided with a means of supporting the said steam port reverse disk.

10. In a rotary engine of the nature indicated, the combination of a rotary head having teeth adapted to intermesh in notches disposed on the cylindrical surface of abutments and a flanged end piece adapted to be oscillated by means of a spirally disposed slot, a reverse pin adapted to travel in said slot and in the slot provided in the shaft on which the aforesaid rotary head is mounted, the said reverse pin being rigidly secured to a reverse shaft adapted to be thrust longitudinally the axis of the said shaft by means of a lever secured to the exterior of my device.

11. In a rotary engine of the nature indicated a steam port reverse disk a flanged end piece co-acting therewith having steam admission ports a rotary head means for oscillating said flanged end piece relative to said rotary head.

12. In a rotary engine a steam port reverse disk a rotary head, a flanged end piece having a helically disposed slot in the hub thereof carried with said rotary head, and means co-acting with said slot to oscillate said flanged end piece to reverse the direction of travel thereof.

13. In a rotary engine a steam port reverse disk a rotary head, a flanged end piece having a helically disposed slot in the hub thereof, and a hollow shaft and slot provided therein to receive a reverse shaft and pin fitting said helical slot to oscillate said flanged end piece to reverse the direction of travel of said engine for the purpose set forth.

In testimony whereof I have signed my name to this specification in the presence of two subscribing witnesses.

JOHN PIERCE FOX.

Witnesses:
J. H. JAHN,
M. WALKER.